United States Patent
Huang

(10) Patent No.: US 9,239,609 B2
(45) Date of Patent: Jan. 19, 2016

(54) METHOD FOR REDUCING POWER CONSUMPTION IN ELECTRONIC APPARATUS

(71) Applicant: VIA TECHNOLOGIES, INC., New Taipei (TW)

(72) Inventor: Cheng-Ming Huang, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 116 days.

(21) Appl. No.: 14/057,277

(22) Filed: Oct. 18, 2013

(65) Prior Publication Data

US 2015/0067367 A1 Mar. 5, 2015

(30) Foreign Application Priority Data

Sep. 2, 2013 (TW) .............................. 102131491 A

(51) Int. Cl.
*G06F 1/32* (2006.01)

(52) U.S. Cl.
CPC .............. *G06F 1/324* (2013.01); *G06F 1/3212* (2013.01)

(58) Field of Classification Search
CPC ..... G06F 1/3212; G06F 1/324; G06F 1/3209; G06F 1/3206; G06F 1/3215; G06F 1/3221; Y02B 60/1228; Y02B 60/1246; Y02B 60/31
See application file for complete search history.

(56) References Cited

U.S. PATENT DOCUMENTS

| | | | |
|---|---|---|---|
| 5,228,062 A | 7/1993 | Bingham | |
| 7,020,834 B2 * | 3/2006 | Chiang et al. ................. | 714/799 |
| 7,254,732 B2 | 8/2007 | Bashford et al. | |
| 7,609,770 B2 * | 10/2009 | Chiang .......................... | 375/242 |
| 8,145,452 B1 * | 3/2012 | Masiewicz et al. ........... | 702/189 |
| 9,128,711 B2 | 9/2015 | Pang et al. | |
| 2009/0083476 A1 * | 3/2009 | Pua et al. ....................... | 711/103 |
| 2009/0274168 A1 | 11/2009 | Glickman et al. | |
| 2011/0289340 A1 | 11/2011 | Rose | |

FOREIGN PATENT DOCUMENTS

| | | |
|---|---|---|
| CN | 101241391 | 8/2008 |
| CN | 101727418 | 6/2010 |
| CN | 202720546 | 2/2013 |
| TW | 200711408 | 3/2007 |

OTHER PUBLICATIONS

English language machine translation of TW 200711408 (published Mar. 16, 2007).

\* cited by examiner

*Primary Examiner* — Dennis M Butler
(74) *Attorney, Agent, or Firm* — McClure, Qualey & Rodack, LLP

(57) ABSTRACT

An electronic apparatus is provided. The electronic apparatus includes a serial advanced technology attachment (SATA) physical layer, a clock generator and a control unit. The SATA physical layer is configured to provide connection with an SATA device and perform data transmission with the SATA device is performed at a first clock frequency. The clock generator is configured to provide a clock signal having the first clock frequency to the SATA physical layer. When at least one specific event is detected by the control unit, the control unit controls the clock generator to provide the clock signal having a second clock frequency to the SATA physical layer, so that the SATA physical layer performs data transmission with the SATA device at the second clock frequency. The second clock frequency is lower than the first clock frequency.

16 Claims, 4 Drawing Sheets

METHOD FOR REDUCING POWER CONSUMPTION IN ELECTRONIC APPARATUS

CROSS REFERENCE TO RELATED APPLICATIONS

This application claims priority of Taiwan Patent Application No. 102131491, filed on Sep. 2, 2013, the entirety of which is incorporated by reference herein.

BACKGROUND OF THE INVENTION

1. Field of the Invention

The present invention relates to bridging devices, and, in particular, to an electronic apparatus having a serial advanced technology attachment (SATA) interface and a method for reducing power consumption of the electronic apparatus by automatically lowering the data transmission rate for saving power when a specific condition occurs.

2. Description of the Related Art

With advances in technology, current computer systems are equipped with SATA interfaces, such as SATA Gen 1/2/3 interfaces. However, when an SATA device is connected to a host (e.g. a computer) through the SATA interface, the data transmission rate depends on the highest data transmission rate supported by the SATA device, the host, and the bridging apparatus. When the connection between the SATA device and a conventional host/bridging apparatus has been built, the data transmission rate may remain constant, and the data transmission rate cannot be dynamically adjusted. As a result, data will be transmitted between the SATA device and the conventional host/bridging apparatus with higher power consumption.

BRIEF SUMMARY OF THE INVENTION

A detailed description is given in the following embodiments with reference to the accompanying drawings.

In an exemplary embodiment, an electronic apparatus is provided. The electronic apparatus includes a serial advanced technology attachment (SATA) physical layer, configured to provide connection with an SATA device, wherein the SATA physical layer performs data transmission with the SATA device at a first clock frequency; a clock generator, configured to provide a clock signal having the first clock frequency to the SATA physical layer; and a control unit, wherein when at least one specific event is detected by the control unit, the control unit controls the clock generator to provide the clock signal having a second clock frequency to the SATA physical layer, so that the SATA physical layer performs data transmission to the SATA device with the second clock frequency. The second clock frequency is lower than the first clock frequency.

In another exemplary embodiment, a method for reducing power consumption of an electronic apparatus is provided. The electronic apparatus includes an SATA physical layer and a clock generator. The method includes the steps of: utilizing the clock generator to provide a clock signal having a first clock frequency to the SATA physical layer; utilizing the SATA physical layer to connect to an SATA device, wherein the SATA physical layer performs data transmission with the SATA device is performed at a first clock frequency; and when at least one specific event is detected, the clock generator provides the clock signal having a second clock frequency to the SATA physical layer, so that the SATA physical layer performs the data transmission with the SATA device at the second clock frequency. The second clock frequency is lower than the first clock frequency.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
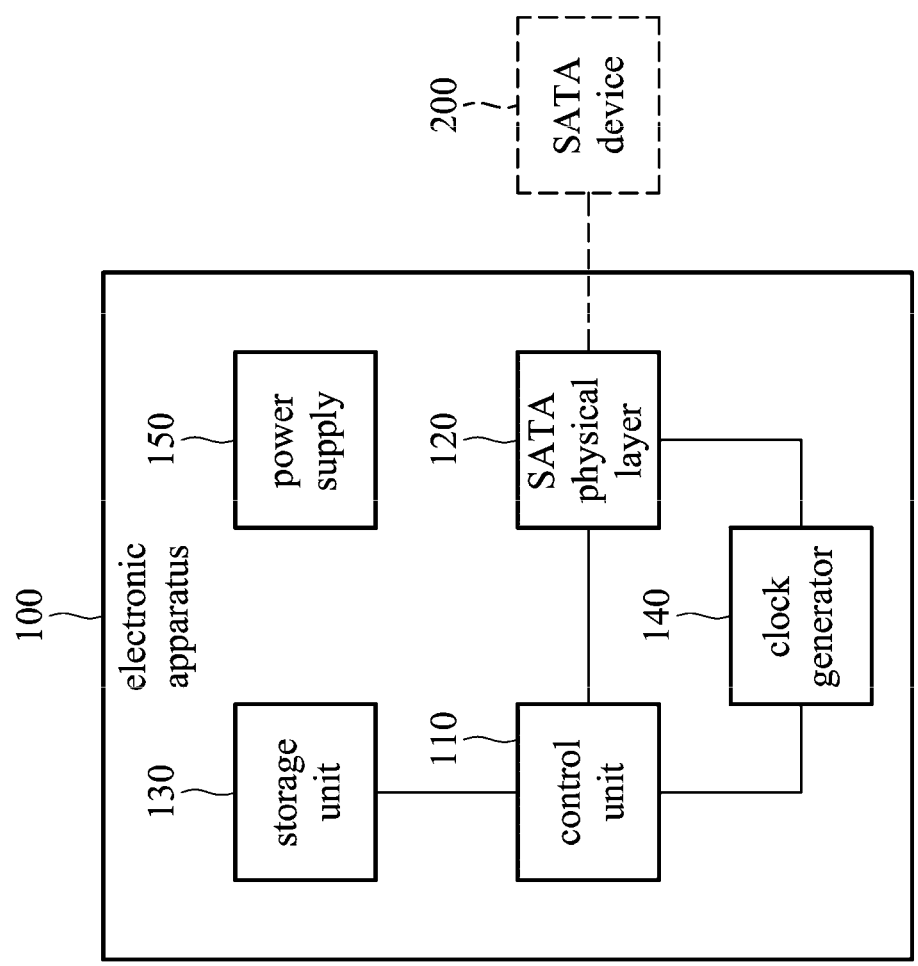
FIG. 1 is a schematic block diagram of an electronic apparatus 100 according to an embodiment of the invention.

FIG. 1 is a schematic block diagram of an electronic apparatus 100 according to an embodiment of the invention. In an embodiment, the electronic apparatus 100 may comprise a control unit 110, an SATA physical layer 120, a storage unit 130, a clock generator 140, and a power supply 150. The control unit 110 is configured to read and execute firmware stored in the storage unit 130. The firmware, such as the basic input/output system (BIOS) code, is used for providing necessary operation functions of the electronic apparatus 100, such as controlling the SATA physical layer 120 and the clock generator 140. In addition, the control unit 110 may read and execute a monitoring program stored in the storage unit 130 to determine the specification of the SATA device connected to the SATA physical layer 120, thereby determining whether a condition for automatically lowering frequency of a clock signal occurs (details will be described later). For example, the storage unit 130 may be a non-volatile memory, such as a ROM, a hard disk, or a flash memory, but the invention is not limited thereto. The SATA physical layer 120 is an interface for connection with hard disk, solid state disks (SSD), CD-ROM, or other electronic apparatuses, such as for connection with the SATA device 200 illustrated in FIG. 1. The SATA device 200 is compatible with SATA Gen 1/2/3. The control unit 110 may provide a control signal to the clock generator 140 to adjust the oscillation frequency of an internal phase-locked loop circuit (not shown) of the clock generator 140, thereby adjusting the frequency of an output clock signal. The power supply 150 is configured to provide power to other components in the electronic apparatus 100. In some embodiments, the power supply 150 may comprise a battery or a battery set for providing power.

The data transmission rate defined in the specification of SATA Gen 1/2/3 are 1.5 Gbps, 3.0 Gbps, and 6.0 Gbps, respectively, and the upper limit of the data transmission rate depends on the specifications of the SATA interfaces of the SATA device 200 and the electronic apparatus 100. In addition, the SATA Gen 3 interface is backward-compatible with the SATA Gen 1/2 interfaces, and the SATA Gen 2 interface is backward-compatible with the SATA Gen 1 interface. If the electronic apparatus 100 supports the SATA Gen 3 specification but the SATA device 200 connected to the electronic apparatus 100 only supports the SATA Gen 2 specification, the control unit 110 may limit the data transmission rate of the SATA physical layer 120 to 3.0 Gbps, which is the data transmission rate defined in the SATA Gen 2 specification.

Specifically, when the SATA device 200 is connected to the SATA physical layer 120, the control unit 110 may perform out-of-band (OOB) handshaking operations to determine the data transmission rate. In the OOB handshaking operations, the SATA device 200 and the control unit 110 may respond to the incoming/outgoing control signals mutually to perform subsequent settings and data transmission, and a transmission link between the SATA device 200 and the electronic apparatus 100 is built.

Figure 2:
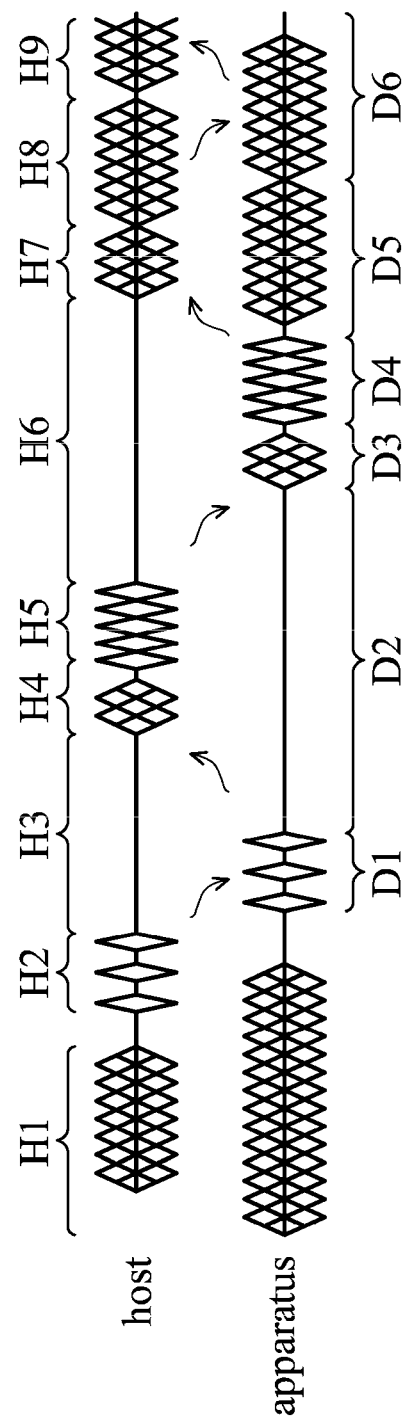
FIG. 2 is a diagram illustrating the OOB handshaking operations between the electronic apparatus 100 and the SATA device 200 for building a transmission link according to an embodiment of the invention.

FIG. 2 is a diagram illustrating the OOB (Out of Band Signaling, OOB) handshaking operations between the electronic apparatus 100 and the SATA device 200 for building a transmission link according to an embodiment of the invention. In one embodiment, the electronic apparatus 100 may be regarded as a host, and the SATA device connected to the electronic apparatus 100 may be regarded as a client. In accordance with the OOB handshaking protocol in the SATA specification, when the SATA device 200 is connected to the SATA physical layer 120, it may indicate that the host and the client are both activated (phase H1). In phase H1, the control unit 110 may ignore any signal from the SATA device 200, and the SATA device 200 may also ignore any signal from the control unit 110 until the control unit 110 transmits a COMRESET signal to the SATA device 200 via the SATA physical layer 120 (phase H2). In phase H2, the COMRESET signal is asserted by the SATA physical layer 120 constantly. Afterwards, the SATA device 200 may respond to the control unit 110 by a COMINIT signal via the SATA physical layer 120 (phase D1). After responding by the COMINIT signal, the SATA device 200 may release the COMINIT signal (phase D2). After receiving the COMINIT signal from the SATA device 200, the control unit 110 may release the COMRESET signal to perform subsequent operations (phase H3).

The control unit 110 may perform calibration at phase H4, and transmit a COMWAKE signal to the SATA device 200 at phase H5. The SATA device 200 may detect the sequence of the COMWAKE signal from the control unit 110, thereby adjusting the transmitter at phase D3. In phase D4, the SATA device 200 may perform a burst transmission of the sequence of the COMWAKE signal to the control unit 110 of the host. In phase D5, the SATA device 200 may transmit series of ALIGN signal sequences to the control unit 110 with the highest data transmission rate supported by the SATA device 200 (e.g. 6.0 Gbps defined in the SATA Gen 3 specification), thereby querying whether the control unit 110 supports the highest data transmission rate (e.g. 6.0 Gbps).

It should be noted that if the control unit 110 does not respond (or ignores) the ALIGN signal sequence with the highest data transmission rate within a predetermined time, the SATA device 200 may lower the data transmission rate to the second highest data transmission rate (e.g. 3.0 Gbps defined in the SATA Gen 2 specification), and transmit the ALIGN signal sequence to the control unit 110 with the second highest data transmission rate. The operations for transmitting the ALIGN signal sequence may be performed repeatedly to lower the data transmission rate until the control unit 110 responds to the ALIGN signal sequence at the same data transmission rate to the SATA device 200 within the predetermined time. Specifically, upon detecting the COMWAKE signal from the SATA device 200, the control unit 110 may start to transmit a D10.2 character at the lowest transmission rate supported by the electronic apparatus 100 (phase H7). The control unit 110 may lock the received ALIGN signal sequence and respond to the SATA device with the received ALIGN signal sequence at the same data transmission rate when ready (phase H8). Meanwhile, the SATA device 200 may also lock the received ALIGN signal sequence from the control unit 110, and inform the control unit 110 that the SATA device 200 is ready for subsequent operations by transmitting a synchronization signal to the control unit 110. After the control unit 110 receiving three consecutive synchronization signals from the SATA device 200, the transmission link for data transmission between the control unit 110 and the SATA device 200 has been built (phases D6 and H9).

In an embodiment, it is assumed that the electronic apparatus 100 and the SATA device 200 may both support the SATA Gen 3 specification, and the SATA Gen 3 transmission link between the electronic apparatus 100 and the SATA device 200 has been built via the aforementioned OOB handshaking protocol. The monitoring program executed by the control unit 110 may continue detecting whether any one of specific events occurs. In an embodiment, the aforementioned specific events may be: (a) the battery capacity of the power supply 150 being lower than a predetermined threshold; (b) the idle count of the SATA transmission channel being larger than a predetermined threshold within a predetermined time period (e.g. 5 seconds or 1 minute); and (c) the amount of transmitted data being smaller than a predetermined value. For example, the control unit 110 may periodically detect whether any activity occurs in the SATA physical layer with a specific period. If there is no activity within the predetermined period, the idle count is increased by 1.

When any of the events (a), (b) or (c) is detected, the control unit 110 may update the settings of the internal registers (not shown), thereby the clock generator 140 is controlled to stop providing the clock signal. Then the clock generator 140 may dynamically lower the frequency of the clock signal and provide the clock signal with a lower frequency to the control unit 110 and the SATA physical layer 120. The transmission link between the SATA device 200 and the control unit 110/SATA physical layer 120 can be built with the clock signal having the lower frequency. In an embodiment, the value of a first register of the control unit 110 may correspond to the activating/deactivating of the clock generator 140. For example, when the value of the first register is 0, the clock generator 140 is shut down (disabled). When the value of the first register is 1, the clock generator 140 is activated (enabled). The value of a second register of the control unit 110 may correspond to the frequency of the clock signal generated by the clock generator 140. In one embodiment, the value of the first register is given as 1 (i.e. the clock generator is activated). When the value of the second register is 00, the frequency of the clock signal generated by the clock generator 140 is for use in the SATA Gen 1 interface (e.g. the clock frequency for the control unit 110 is 37.5 MHz, and the clock frequency for the SATA physical layer 120 is 37.5 MHz). When the value of the second register is 01, the frequency of the clock signal generated by the clock generator 140 is for use in the SATA Gen 2 interface (e.g. the clock frequency for the control unit 110 is 75 MHz, and the clock frequency for the SATA physical layer 120 is 150 MHz). When the value of the second register is 10, the frequency of the clock signal generated by the clock generator 140 is for use in the SATA Gen 3 interface (e.g. the clock frequency for the control unit 110 is 150 MHz, and the clock frequency for the SATA physical layer 120 is 300 MHz). It should be noted that the clock frequencies for the control unit 110 and the SATA physical layer 120 are not limited to the aforementioned values, and the clock frequencies for the control unit 110 and the SATA physical layer 120 can be adjusted in accordance with practical conditions.

Specifically, when any one of the events (a), (b) or (c) is detected, the control unit 110 may firstly control the clock generator 140 to stop providing the clock signal, thus the transmission link between the electronic apparatus 100 and the SATA device 200 is terminated. Afterwards, the SATA device 200 may resend the COMINIT signal to the electronic apparatus 100 for rebuilding the transmission link. The control unit 110 may further control the clock generator 140 to output a clock signal with a lower frequency to the SATA physical layer 120, and thus the SATA physical layer 120 may respond the ALIGN signal sequence from the SATA device 200 with a lower data transmission rate (e.g. 3 Gbps defined in SATA Gen 2 specification) for rebuilding the transmission link. In other words, when any one of the events (a), (b) and (c) is detected, the electronic apparatus 100 may lower the frequencies of the clock signals for the electronic apparatus 100 and the SATA device 200. Accordingly, data can be transmitted between the electronic apparatus 100 and the SATA device 200 at a lower data transmission rate, thereby reducing power consumption.

Figure 3:
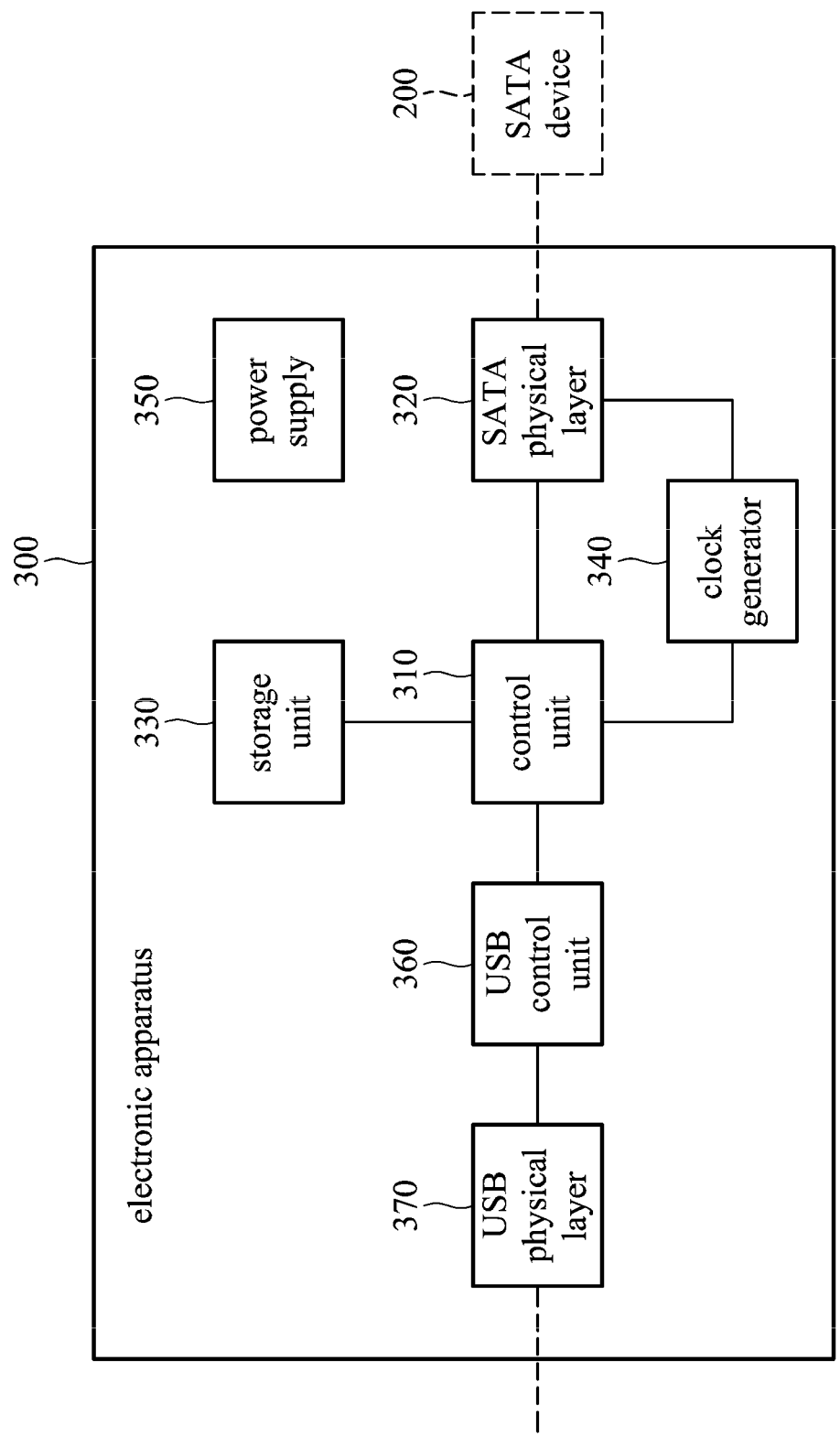
FIG. 3 is a schematic block diagram of an electronic apparatus 300 according to another embodiment of the invention.

FIG. 3 is a schematic block diagram of an electronic apparatus 300 according to another embodiment of the invention. The electronic apparatus 300 may be regarded as a standalone bridging apparatus (e.g. an SATA to USB external enclosure), or integrated into a host (e.g. a computer). Referring to both FIG. 1 and FIG. 3, the primary components 310-350 in the electronic apparatus 300 are identical to the components 110-150 in the electronic apparatus 100 in FIG. 1, and the electronic apparatus 300 further includes a universal serial bus (USB) control unit 360 and a USB physical layer 370. The USB control unit 360 is configured to convert the data, which are from the control unit 310, from the SATA protocol to the USB protocol, and transmits the converted data in the USB protocol to another apparatus via the USB physical layer 370. Specifically, the SATA device 200 connected to the electronic apparatus 300 may transmit data in the SATA protocol to the control unit 310 via the SATA physical layer 320, and the USB control unit 360 may convert the data from the SATA protocol to the USB protocol, thereby implementing a bridging apparatus between the SATA interface and the USB interface. For one having ordinary skill in the art, the details for converting signals from the SATA protocol to the USB protocol are known, and thus will be omitted here.

Assuming that a first clock frequency (e.g. 6 Gbps in SATA Gen 3) is provided for the data transmission between the electronic apparatus 300 and the SATA device 200 connected to the electronic apparatus 300, the clock generator 340 may provide a clock signal having the first clock frequency to both the SATA physical layer 320 and the control unit 310. When any one of events (a), (b), or (c) is detected, the control unit 310 may control the clock generator 340 to provide the clock signal having a second clock frequency (e.g. 3 Gbps in SATA Gen 2) to the SATA physical layer 320, so that the second clock frequency can be provided for the data transmission between the SATA physical layer 320 and the SATA device 200. Before providing the clock signal having the second clock frequency, the control unit 310 may control the clock generator 340 to stop providing the clock signal having the first clock frequency, thereby terminating the transmission link between the electronic apparatus 300 and the SATA device 200. After terminating the transmission link between the electronic apparatus 300 and the SATA device 200, the control unit 310 may control the clock generator 340 to provide the clock signal having the second clock frequency to the SATA physical layer 320 and the control unit 310. The second clock frequency is lower than the first clock frequency. After terminating the transmission link, the SATA device 200 may resend the COMINIT signal for rebuilding the transmission link with the electronic apparatus 300 by using the second clock frequency. In an embodiment, the control unit 310 may update the values of internal registers (not shown), thereby restarting the clock generator 340 and dynamically lowering the frequency of the clock signal provided to the control unit 310 and the SATA physical layer 320 (i.e. stopping the clock generator 340 before providing the clock signal with a lowered frequency), so that the transmission link between the SATA device 200 and the electronic apparatus 300 can be rebuilt with a lower clock frequency. In the embodiment, it should be noted that when the USB physical layer 370 is connected to a USB host (e.g. a computer), the data transmission rate and the link are not affected by the SATA interface. In other words, when the transmission link at the SATA interface side is affected by a specific event, the data transmission rate can be kept at a constant value in the transmission link at the USB interface side without changing the data transmission rate or terminating the transmission link.

Figure 4:
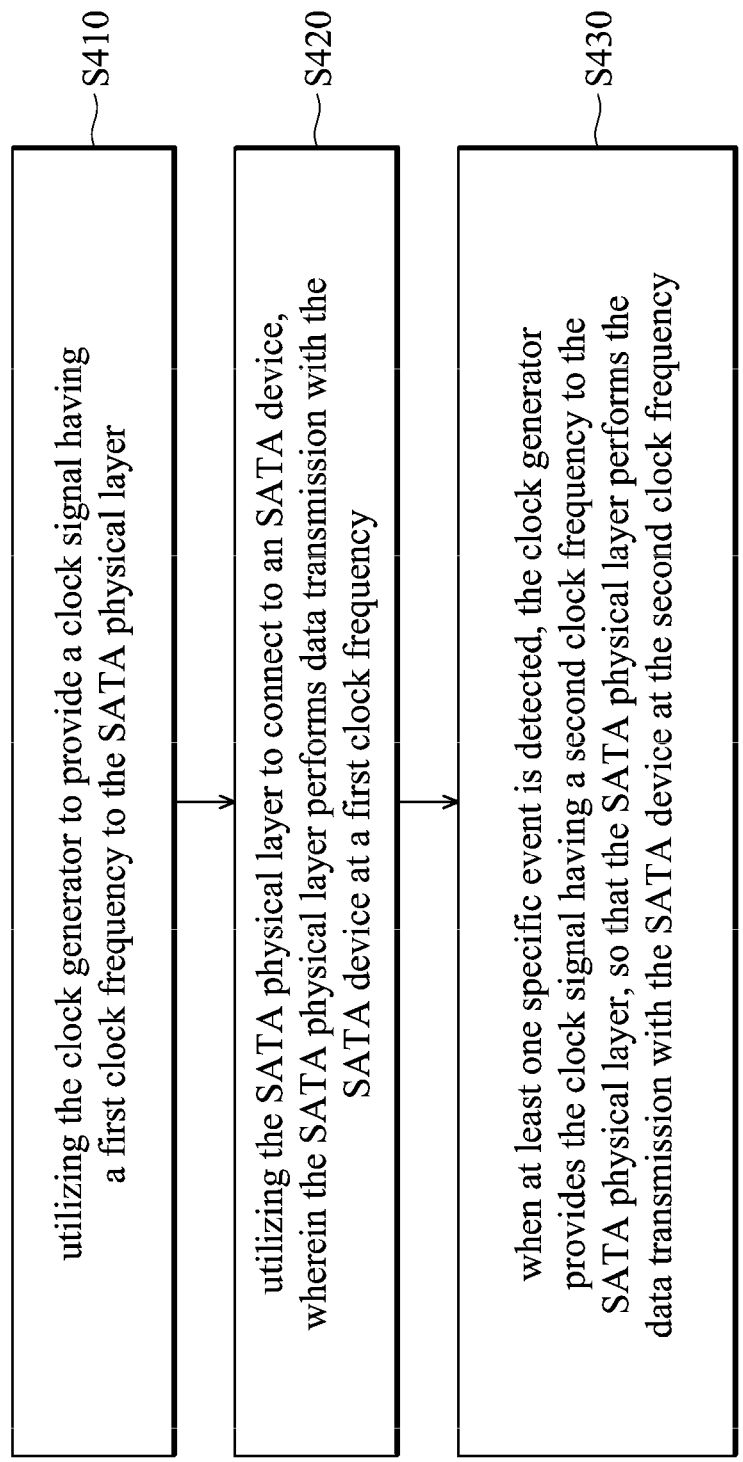
FIG. 4 is a flow chart illustrating a method for reducing power consumption in an electronic apparatus according to an embodiment of the invention.

FIG. 4 is a flow chart illustrating a method for reducing power consumption in an electronic apparatus according to an embodiment of the invention. Referring to FIG. 1 and FIG. 4, in step S410, the clock generator 140 may provide a clock signal having a first clock frequency to the SATA physical layer 120. In step S420, the SATA physical layer 120 is connected to the SATA device 200, and the SATA physical layer 120 performs data transmission with the SATA device 200 at the first clock frequency (e.g. 6 Gbps in SATA Gen 3). In step S430, when at least one specific event is detected, the control unit 110 may control the clock generator 140 to provide the clock signal having a second clock frequency to the SATA physical layer 120, so that the SATA physical layer 120 performs the data transmission with the SATA device 200 at the second clock frequency (e.g. 3 Gbps in SATA Gen 2). The second clock frequency is lower than the first clock frequency. It should be noted that the aforementioned specific events may be: (a) the remaining battery capacity of the power supply 150 being lower than a predetermined threshold; (b) the idle count of the SATA transmission channel being larger than a predetermined threshold within a specific time period (e.g. 5 seconds or 1 minute); and (c) the amount of transmitted data being smaller than a predetermined value. In other words, when any one of the events (a), (b) and (c) occurs, the electronic apparatus 100 may lower the clock frequency of the clock signal for the electronic apparatus 100 and the SATA device 200, and the data transmission between the electronic apparatus 100 and the SATA device 200 can be performed with a lower clock frequency, thereby reducing power consumption.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic apparatus, comprising
a serial advanced technology attachment (SATA) physical layer, configured to provide connection with an SATA device for building a transmission link, wherein the SATA physical layer performs data transmission with the SATA device at a first clock frequency;
a clock generator, configured to provide a clock signal having the first clock frequency to the SATA physical layer; and
a control unit, wherein after the transmission link is built between the SATA device and the electronic apparatus, when at least one specific event is detected by the control unit, the control unit controls the clock generator to dynamically provide the clock signal having a second clock frequency to the SATA physical layer, so that the SATA physical layer performs the data transmission with the SATA device at the second clock frequency, wherein the second clock frequency is lower than the first clock frequency.

2. The electronic apparatus as claimed in claim 1, wherein the at least one specific event indicates that a remaining battery capacity of a power supply of the electronic apparatus is lower than a predetermined threshold value.

3. The electronic apparatus as claimed in claim 1, wherein the at least one specific event indicates that an idle count within a predetermined period is larger than a predetermined threshold value.

4. The electronic apparatus as claimed in claim 1, wherein the at least one specific event indicates that an amount of data transmitted by the control unit is smaller than a predetermined value.

5. The electronic apparatus as claimed in claim 1, wherein when the at least one specific event is detected by the control unit, the control unit further controls the clock generator to stop providing the clock signal having the first clock frequency to terminate the transmission link between the electronic apparatus and the SATA device.

6. The electronic apparatus as claimed in claim 5, wherein the control unit further controls the clock generator to provide the clock signal having the second clock frequency, so that the control unit responds to a second alignment signal corresponding to the second clock frequency from the SATA device to rebuild the transmission link.

7. The electronic apparatus as claimed in claim 6, wherein when the SATA device transmits a first alignment signal corresponding to the first clock frequency to the electronic apparatus, the control unit does not respond to the first alignment signal from the SATA device, and
wherein when the SATA device does not receive a response to the first alignment signal, the SATA device generates the second alignment signal corresponding to the second clock frequency, and the control unit responds to the second alignment signal to rebuilt the transmission link.

8. The electronic apparatus as claimed in claim 1, wherein the control unit further comprises:
a first register, having a first value configured to control activating and deactivating of the clock generator; and
a second register, having a second value configured to control a clock frequency of the clock signal generated by the clock generator.

9. A method for reducing power consumption of an electronic apparatus, wherein the electronic apparatus comprises an SATA physical layer and a clock generator, the method comprising:
utilizing the clock generator to provide a clock signal having a first clock frequency to the SATA physical layer;
utilizing the SATA physical layer to connect to an SATA device for building a transmission link, wherein the SATA physical layer performs data transmission with the SATA device at a first clock frequency; and
when at least one specific event is detected after the transmission link is built between the SATA device and the electronic apparatus, the clock generator dynamically provides the clock signal having a second clock frequency to the SATA physical layer, so that the SATA physical layer performs the data transmission with the SATA device at the second clock frequency,
wherein the second clock frequency is lower than the first clock frequency.

10. The method as claimed in claim 9, wherein the at least one specific event indicates that a remaining battery capacity of a power supply of the electronic apparatus is lower than a predetermined threshold value.

11. The method as claimed in claim 9, wherein the at least one specific event indicates that an idle count within a predetermined period is larger than a predetermined threshold value.

12. The method as claimed in claim 9, wherein the at least one specific event indicates that an amount of data transmitted by the control unit is smaller than a predetermined value.

13. The method as claimed in claim 9, further comprising:
controlling the clock generator to stop providing the clock signal having the first clock frequency to terminate the transmission link between the electronic apparatus and the SATA device when the at least one specific event is detected.

14. The method as claimed in claim 13, further comprising:
controlling the clock generator to provide the clock signal having the second clock frequency to respond to a second alignment signal corresponding to the second clock frequency from the SATA device to rebuild the transmission link.

15. The method as claimed in claim 14, wherein the step of rebuilding the transmission link further comprises:
ignoring a first alignment signal corresponding to the first clock frequency from the SATA device; and
when the SATA device does not receive a response to the first alignment signal and generates a second alignment signal corresponding to the second clock frequency, responding to the second alignment signal to rebuild the transmission link.

16. The method as claimed in claim 9, further comprising:
utilizing a first value of a first register of the electronic apparatus to control activating and deactivating of the clock generator; and
utilizing a second value of a second register of the electronic apparatus to control a clock frequency of the clock signal generated by the clock generator.

* * * * *